US006233682B1

(12) United States Patent
Fritsch

(10) Patent No.: US 6,233,682 B1
(45) Date of Patent: May 15, 2001

(54) DISTRIBUTION OF MUSICAL PRODUCTS BY A WEB SITE VENDOR OVER THE INTERNET

(76) Inventor: Bernhard Fritsch, 220 E. 65th St., New York, NY (US) 10021

( * ) Notice: Subject to any disclaimer, the term of this patent is extended or adjusted under 35 U.S.C. 154(b) by 0 days.

(21) Appl. No.: 09/487,373

(22) Filed: Jan. 18, 2000

Related U.S. Application Data

(60) Provisional application No. 60/116,918, filed on Jan. 22, 1999, provisional application No. 60/116,910, filed on Jan. 22, 1999, provisional application No. 60/116,779, filed on Jan. 22, 1999, provisional application No. 60/116,917, filed on Jan. 22, 1999, provisional application No. 60/116,780, filed on Jan. 22, 1999, and provisional application No. 60/116,778, filed on Jan. 22, 1999.

(51) Int. Cl.[7] ........................................................ H04L 9/00
(52) U.S. Cl. .............................. 713/168; 705/26; 705/56; 705/27; 713/200
(58) Field of Search ................................. 705/26, 27, 56; 713/150, 168, 200, 201

(56) References Cited

U.S. PATENT DOCUMENTS

| | | | |
|---|---|---|---|
| 5,721,778 | * | 2/1998 | Kubota et al. ........................ 380/10 |
| 5,907,831 | * | 5/1999 | Lotvin et al. ......................... 705/14 |
| 5,963,916 | * | 10/1999 | Kaplan .................................. 705/26 |
| 6,038,591 | * | 3/2000 | Wolfe et al. ......................... 709/206 |

* cited by examiner

*Primary Examiner*—Thomas R. Peeso
(74) *Attorney, Agent, or Firm*—Brown Raysman Millstein Felder & Steiner LLP

(57) ABSTRACT

The system and method permit the purchase of audio music files over the Internet. The PC user logs onto the vendor's web site and browses the songs available for purchase. The songs can be arranged by artist, music style, etc., as mentioned above. Further, the vendor can provide suggestions on the web site, directing the PC user to songs that might be desirable, based on that PC user's previous purchases, her indicated preferences, popularity of the songs, paid advertising and the like. If interested in a song, the PC user has the option of clicking on a song to "pre-listen" to it—hearing a 20-second clip, for example. If the PC user then wishes to purchase the song, she can submit her order by clicking on the icons located next to each song/album. The order will be reflected in the shopping basket, always visible on the screen. As the PC user selects more items, each and every item is displayed in the shopping basket. At any point in time, the PC user can review her selections, deleting items she no longer desires.

21 Claims, 24 Drawing Sheets

Figure 2B

Past Orders

Your are logged in as: Bernhard
Your MMP Key:
nSUC0IqJOO8mZ+vq+ycDDs4tVZaR4eKI9uS8k+bmA Glenn Miller - Moonlight Serenade 

Police,The: Ghost In The Machine
Glenn Miller - In The Mood 

Louis Armstrong - Jelly Roll Blues 

Kwame Prime - Talk to me
(radio-edit) 

Louis Armstrong - Ain't Misbehavin' 

Kwame Prime - Sun shine 

Police,The: Every Breath You Take:
Singles
Louis Armstrong - So Long Dearie 

Louis Armstrong - Dear Old
Southland 
Louis Armstrong - Mack The Knife 

Louis Armstrong - Chimes Blues 

Louis Armstrong - Indiana 

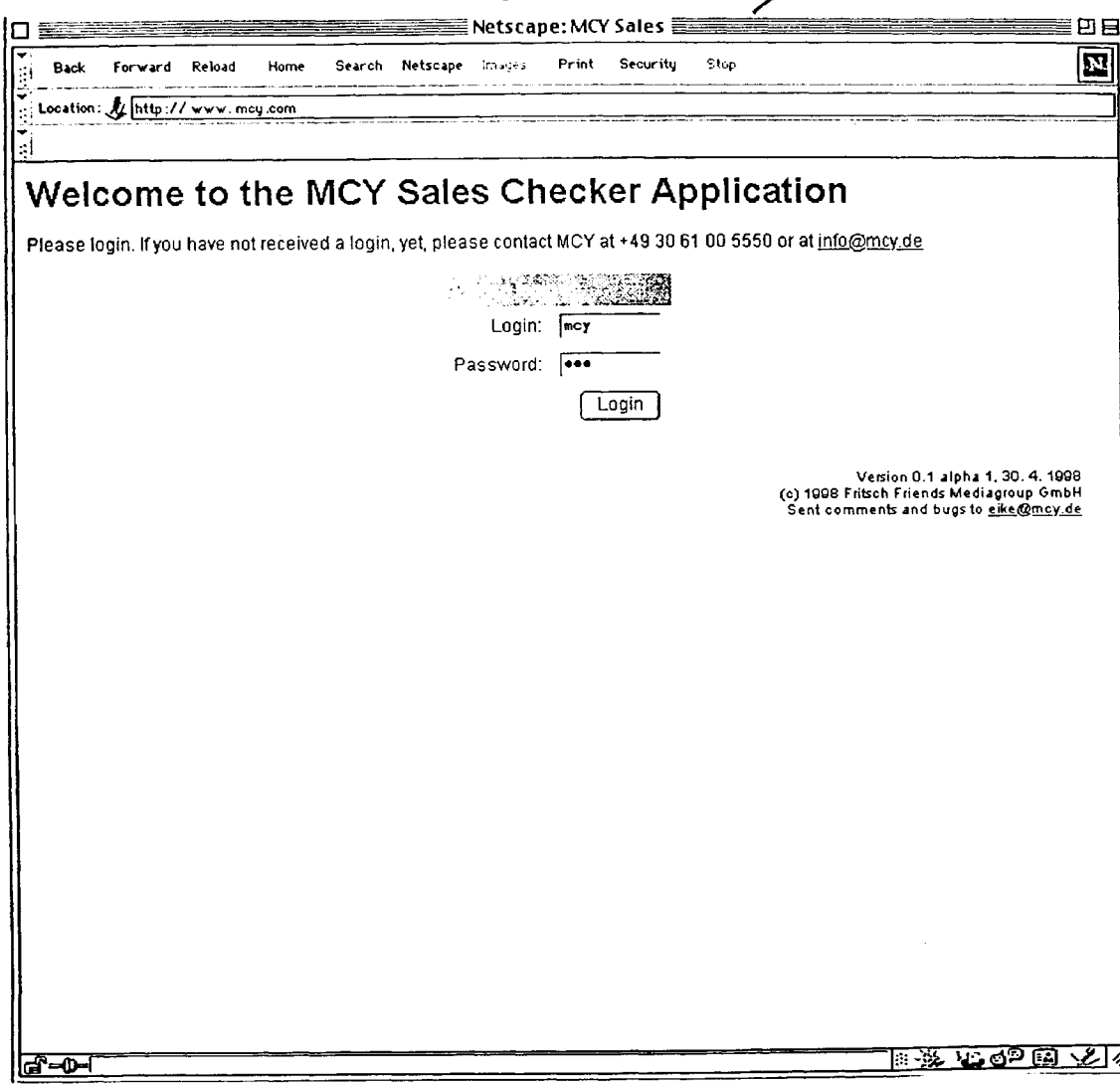

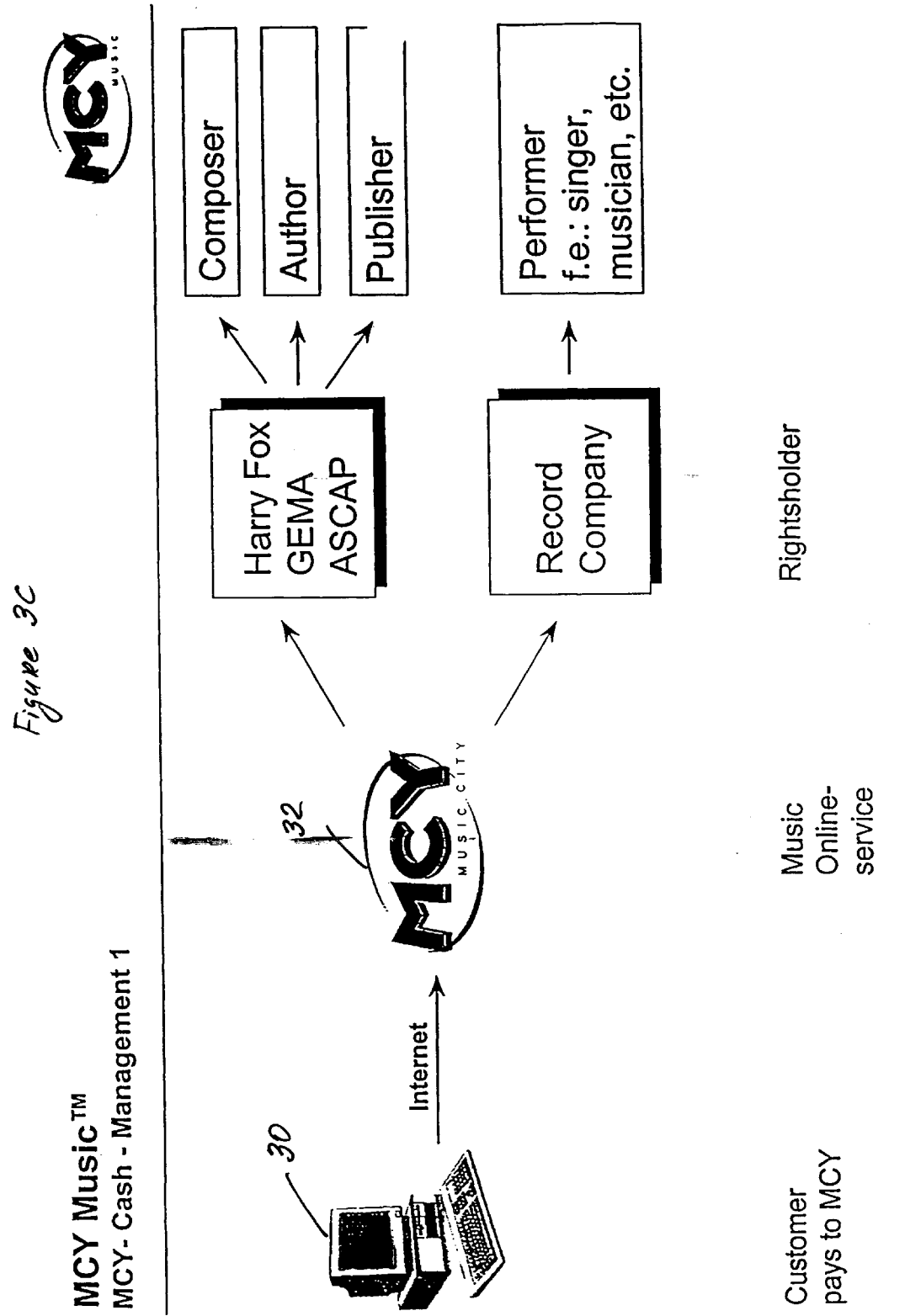

NETrax

40

DISTRIBUTION OF MUSICAL PRODUCTS BY A WEB SITE VENDOR OVER THE INTERNET

CROSS-REFERENCE TO RELATED APPLICATIONS

This application claims the benefit of U.S. Provisional Application No. 60/116,918, filed on Jan. 22, 1999; U.S. Provisional Application No. 60/116,910, filed on Jan. 22, 1999; U.S. Provisional Application No. 60/116,779, filed on Jan. 22, 1999; U.S. Provisional Application No. 60/116,917, filed on Jan. 22, 1999; U.S. Provisional Application No. 60/116,780, filed on Jan. 22, 1999; and U.S. Provisional Application No. 60/116,778, filed on Jan. 22, 1999.

BACKGROUND OF THE INVENTION

The present invention relates generally to digital music downloading. More particularly, the present invention relates to a system and method for distributing digital music over the Internet by a web site vendor.

The Internet has offered opportunities for electronic commerce of massive proportions. Among other things, distribution of music over the computer-implemented global network is a well suited application of e-commerce, whereby consumers can easily and quickly find and purchase individual tracks or entire albums. A need therefore exists for a system and method that provide a music web site that is comprehensive, versatile, user-friendly, and protects the proprietary rights of artists and other rights holders.

BRIEF SUMMARY OF THE INVENTION

It is an object of the present invention to provide a digital music distribution web site.

It is another object of the present invention to provide a digital music distribution web site wherein a customer shopping list is always visible on a display screen.

It is yet another object of the present invention to display a shopping history for each registered user/customer for unlimited downloading of the previously purchased items.

It is still another object of the present invention to display a sales and royalty history for rights holders based on the sales of the product via the web site.

It is still another object of the present invention to prohibit an unauthorized transfer of downloaded music files for playback by an unregistered user/customer.

The above and other objects are achieved by a system and method for distributing products over the Internet. According to the present invention, a login screen is displayed on a video monitor that allows a user to enter an unique identifier for accessing database information. After the validity of the entered unique identifier is confirmed, a shopping list is displayed that lists items for purchase as selected by the user. The listed items are in digital format suitable for downloading to a user's computer connected to the Internet and are in other media format suitable for shipping to the user.

In accordance with one aspect of the present invention, the listed items are either compact disks containing music recorded thereon or digital music in an encoded format, and the shopping list is displayed on the video monitor as long as at least one item is contained therein.

In accordance with another aspect of the present invention, a portion of digital music is retrieved from a database and the retrieved portion of digital music is then played for the user.

BRIEF DESCRIPTION OF THE DRAWINGS

The present invention is illustrated in the figures of the accompanying drawings which are meant to be exemplary and not limiting, in which like reference characters refer to like or corresponding parts, and in which:

FIG. 2B shows in detail the records reflecting previous purchases listed under the "Past Orders" sub-heading;

FIG. 3A shows an illustration of the monitor screen displaying the user interface for accessing the information on royalties;

FIG. 3C is a block diagram of the sales sub-system for determining sales and royalties for the rights-holders in accordance with the present invention;

DETAILED DESCRIPTION OF THE PREFERRED EMBODIMENTS

As a general overview, the present invention includes a system and method for maintaining a music web site on the Internet. Consumers may access the web site via a personal computer or any other wired or wireless Internet access device, such as WebTV, personal digital assistant, cellular telephone, etc., to obtain a variety of services and products. For instance, a consumer may browse through artists, tracks or albums, pre-listen to a portion of the song and purchase the selected song either by downloading the digital data to her computer hard drive or by placing a mail order for a compact disk (CD). A specially encoded or encrypted MP3 files called "NETrax" are delivered from a server over the Internet or cable services to the end consumers' home PC.

The present invention is directed to, among other things, a network-based system for distribution of musical products over a network, such as the Internet for example. The system includes a server platform for processing user requests and other information associated with the operation of the system. The server is connected to a database, which may be remote or local, for storing data. The stored data represents digitized songs, text associated with each song such as track name, album name, artist name, lyrics, etc., image data, graphics, etc.

The server is a node on a global computer-implemented network, such as the Internet. As known to those skilled in the art, a network router may be used to connect the server to the Internet for controlling the flow of data. Also connected to the Internet is a plurality of nodes, such as personal computers, Web devices, etc., under control by the users (hereinafter collectively referred to as PC users). The PC users communicate with the server using dial-up modems, cable modems, IDSN, DSL, etc., and using browser programs executing on their personal computers, as well known to those skilled in the art. Communication links or sessions are established between the PC users and the server, via the Internet, when the PC users log onto the web site hosted by the server.

In the preferred embodiment, a PC user logs on to the Internet to access the World Wide Web portion thereof using a web browser program. That is, the PC user selects and enters a URL address for the vendor's web site on her computer, and a communication link is established between the PC user and the selected vendor's web site. The request from the browser goes out to the server using the Internet (HTTP) protocol. Using SQL commands, the server then accesses the database maintaining the requested URL address information, and the HTML-based results are transferred from the database to the server and subsequently to the client's browser for display on the PC user display monitor.

Figure 1A:
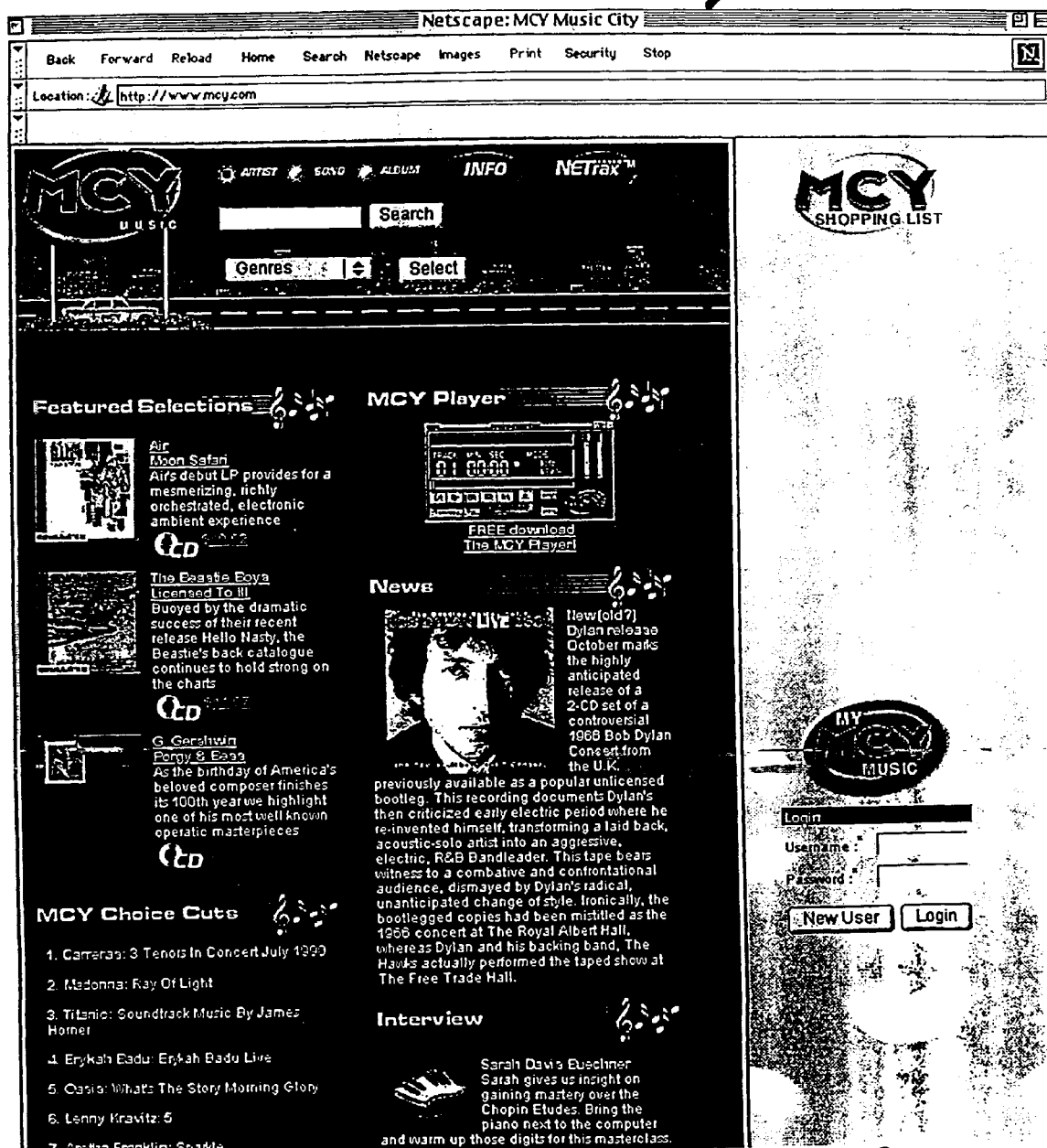
FIG. 1A shows an illustration of the video display screen as viewed by the PC user after connecting to the vendor's web site for distributing musical products.

FIG. 1A shows an illustration of the video display screen 10 as viewed by the PC user after connecting to the vendor's web site for distributing musical products.

As shown in the figure, the web site display is divided into 2 portions: main portion 12 on the left side of the screen 10 contains fields for entering music-related search queries. For example, the PC user may search for desired songs by artist after entering the artist's name. The operation is carried out by various search engines for searching relational databases. Alternatively, the PC user may look for a song by title or album name. Furthermore, as shown in FIG. 1A, songs and/or albums attributed to different genres may be displayed on the screen in response to the PC user's selection.

Furthermore, a music player for playing the digital music downloaded via the Internet from the server is displayed in the main section of the screen. The music player, known as "MCY NETrax Player", may be downloaded to the PC also via the Internet from the server and contains operation controls for listening to the downloaded digital music.

The main section contains various content under several headings and sub-headings. For example, FIG. 1A shows albums and/or songs under the heading "Featured Selections" as selectively featured on the web site. Under the "MCY Choice Cuts" heading, a number of songs/albums is listed as, once again, selected by the web site vendor. FIG. 1A also shows the "News" category, representatively profiling an artist, and under the "Interview" heading an interview with an artist is available for viewing. It is understood, of course, that other music content and categories, headings, sub-headings, etc., may be provided on the web site, including hyperlinks to other web sites, pages, etc. It is noted that a vertical scroll bar may be required to view the content of the entire frame occupying the left portion of the screen.

The right portion of the display screen is independently controlled from the left portion and includes the "Shopping List" heading, as well as the login procedure for PC users. In particular, when a PC user desires to purchase a song or an album, she registers with the web site vendor using the on-line login procedure. The registration comprises entering the username and password to gain access to the web site vendor's products. When a new PC user logs in, she selects a username and password and then clicks on the "New User" software button on the screen. The new PC user is then requested to re-confirm the selected password by entering the password once more. If the password is properly re-confirmed, she is allowed to purchase CDs, download digital music, or make other purchases from the web site as described below. For repeat users, after clicking on the "Login" software button, the entered username and password are compared with those stored in the database connected to the server. If the match is found, the access to the purchase transactions on the web site is validated, and the PC user is permitted to shop for music and other goods. Otherwise, the error message is displayed, and the PC user is prohibited from buying the music or other products. In this case, however, the PC user may still use the left portion of the screen to browse through various titles, read the news, etc., as described above.

Figure 1B:
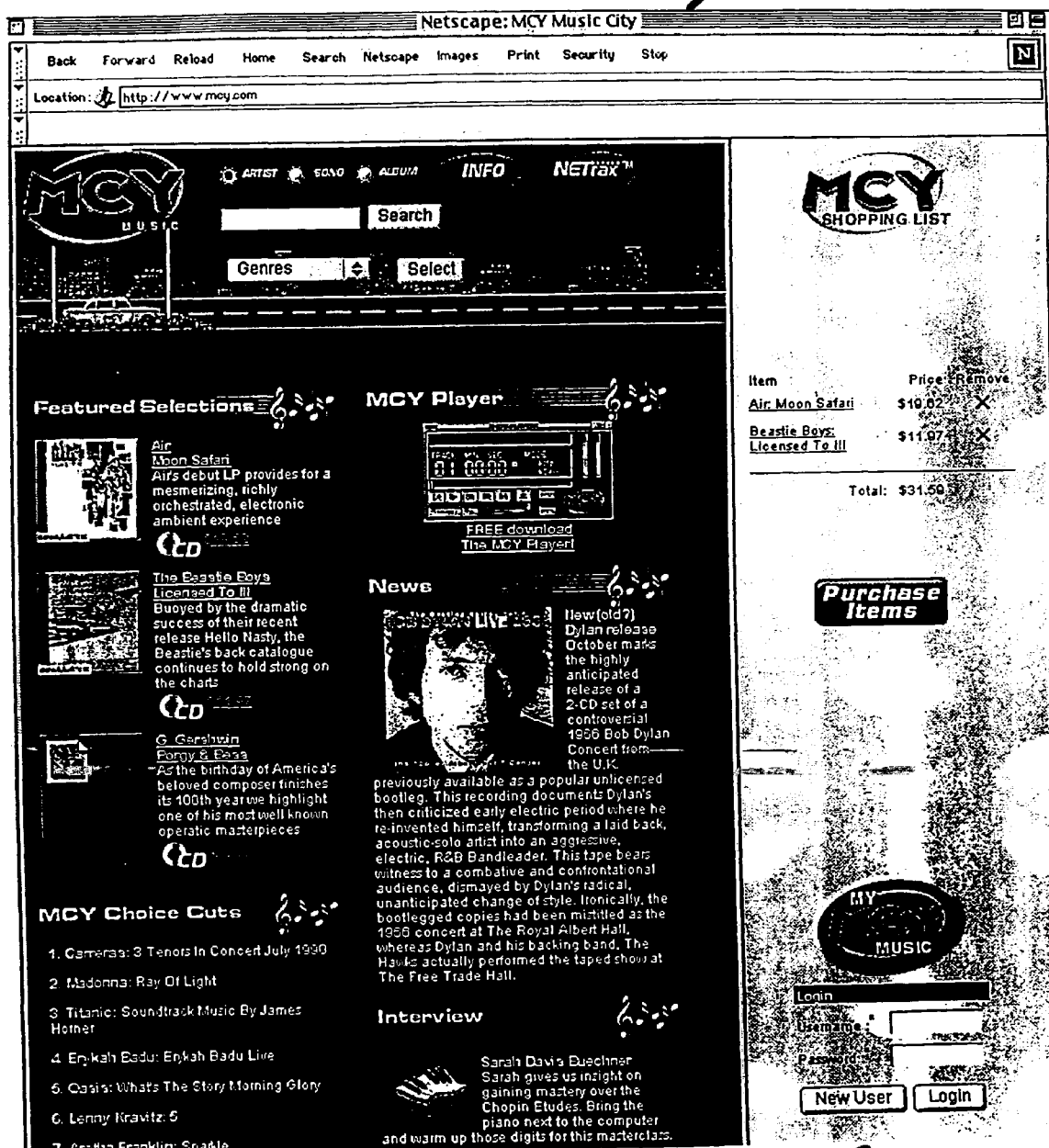
FIG. 1B shows an illustration of the video display screen after the PC user's login has been successfully completed.

FIG. 1B shows an illustration of the video display screen after the PC user's login has been successfully completed. In this case, after browsing through the available songs and albums, let it be assumed that the PC user decides to purchase two albums. By clicking on her selection in the left portion of the screen, the desired items, either CD or downloadable digital music, appear in the right portion under the "MCY Shopping List" heading.

Namely, as the PC user browses through the web site, she can select items of interest for purchase. These items are displayed in a "shopping basket," that is, the right portion of the PC user's computer screen as shown in FIG. 1B. The shopping basket is displayed continuously if there is at least one item therein. Alternatively, the shopping basket can be displayed continuously even when empty. Among other things, the shopping basket can display the name and quantity of the items selected, as well as the cost. The shopping basket can also indicate the total cost of the items in the shopping basket, as shown in FIG. 1B.

Figure 1C:
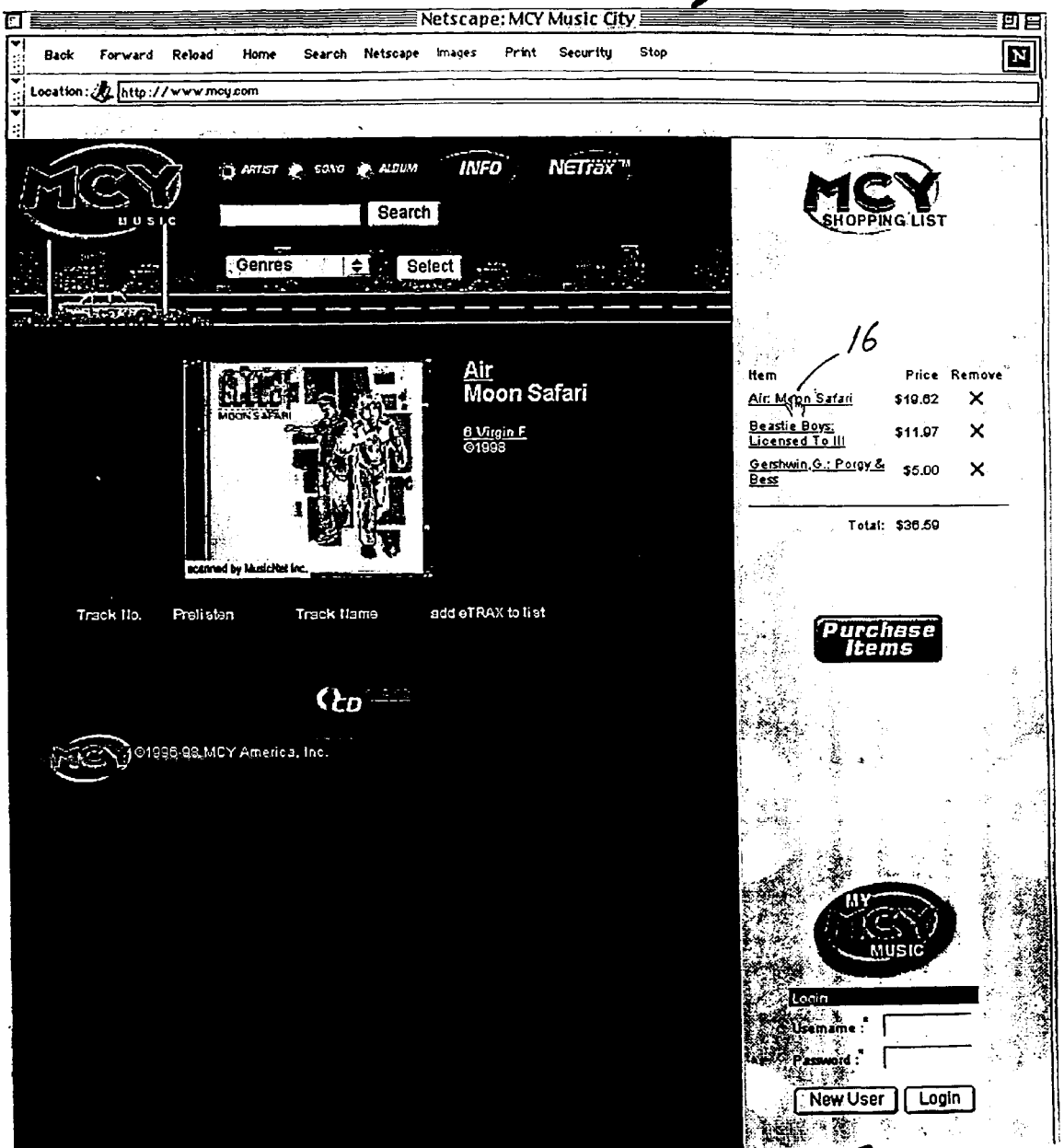
FIG. 1C illustrates an option for the PC user to click on a song to "pre-listen" to it—hearing a 20-second clip, for example.

In the preferred embodiment, the system permits the purchase of audio music files over the Internet. The PC user logs onto the vendor's web site and browses the songs available for purchase. The songs can be arranged by artist, music style, etc., as mentioned above. Further, the vendor can provide suggestions on the web site, directing the PC user to songs that might be desirable, based on that PC user's previous purchases, her indicated preferences, popularity of the songs, paid advertising and the like. If interested in a song, the PC user has the option of clicking on a song to "pre-listen" to it—hearing a 20-second clip, for example—as illustrated in FIG. 1C. If the PC user then wishes to purchase the song, she can submit her order by clicking on the icons located next to each song/album, as also shown in FIG. 1C. The order will be reflected in the shopping basket, always visible on the screen. As the PC user selects more items, each and every item is displayed in the shopping basket (to the extent that space permits—a scroll bar may be necessary should the PC user select a large number of items). At any point in time, the PC user can review her selections, deleting items she no longer desires. When the PC user has developed a satisfactory list, she can submit her order by clicking on the "Purchase Items" button, as illustrated in FIG. 1E showing the magnified right portion of the screen, including the shopping basket. The purchased items will be delivered immediately over the Internet to the user's computer if the selected music is in downloadable digital format. The user can then listen to the song at his computer or download it onto a portable player. Those items that are not available in digital format or as requested by the PC user, will be processed accordingly.

According to the present invention, the network-based system described above includes an e-commerce platform, suited particularly for the digital distribution of audio files (named NETrax), as well as regular mail order. The shopping basket provides a unique feature capable of handling heterogeneous products, such as the listing of audio files and any other digital files that after purchasing can be delivered digitally directly through the net, and traditional mail order products. According to one aspect of the present invention, all these products can be conveniently placed onto one shopping list even though they are not homogeneous. Conveniently, the customer can place digital orders (such as NETrax) and will get those delivered immediately via digital delivery over the internet to her PC; additionally, all other orders of finished product entered into the shopping list will be shipped to her home by mail, such as a private courier, for example.

In accordance with another aspect of the present invention, the shopping basket is always visible on the right side of the screen. The on-line consumer is thus able to constantly monitor the contents of her shopping list and the cost associated with her spending spree. By making the shopping basket visible on the screen all the time eliminates any hidden factors or charges, and it is always clear to the consumer what she intends to purchase.

By clicking on the product, visible on the "MCY Shopping List", the consumer can receive a detailed description of the product on the list before purchase. FIG. 1C representatively illustrates the details of the album entitled "Air Moon Safari" in the left portion of the screen, which is displayed in response to the pointer—the hand tool 16—activated by the user to select the desired item ("Air Moon Safari") in the shopping basket.

Figure 1D:
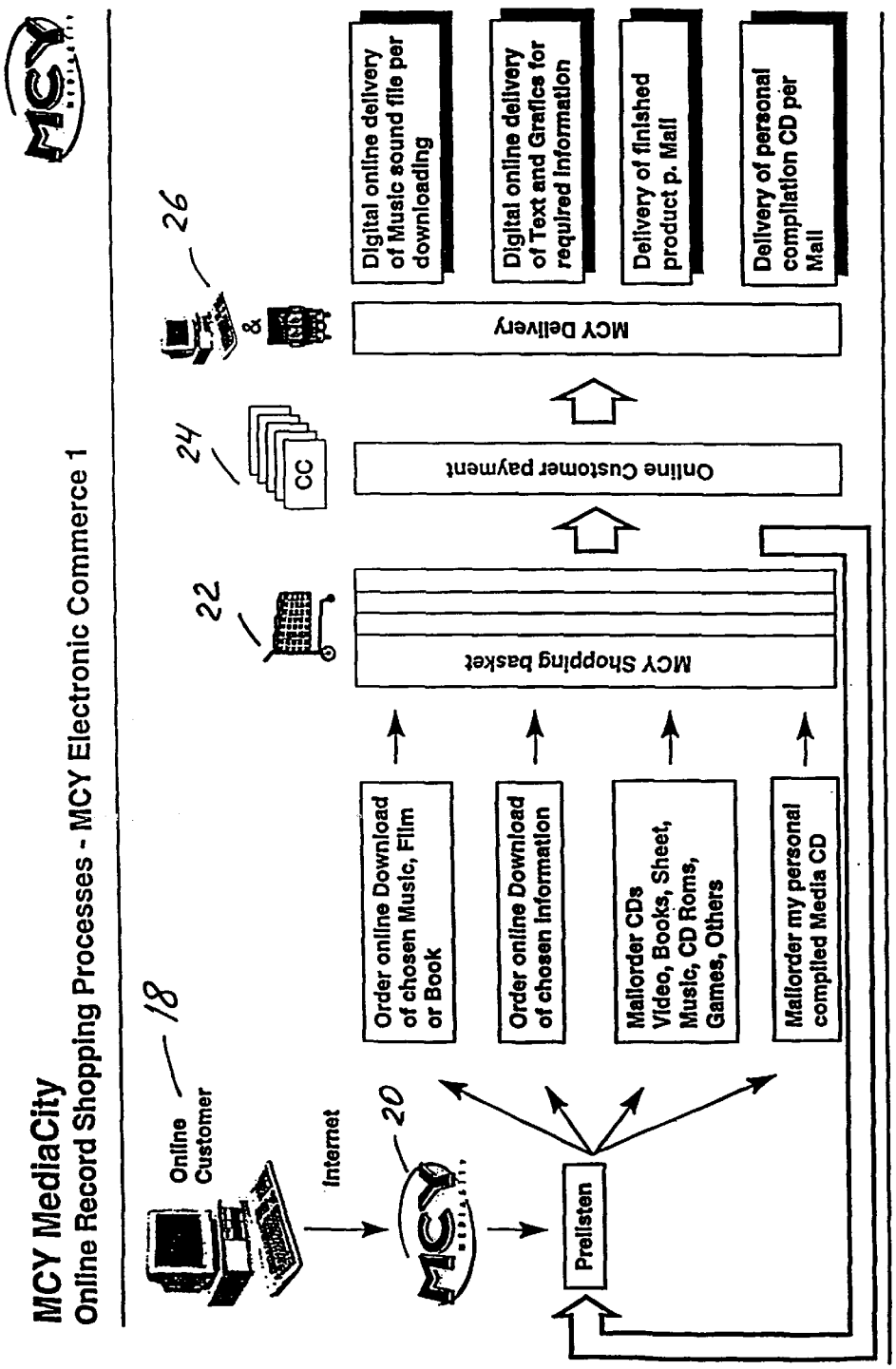
FIG. 1D is a block diagram of the network-based music distribution system according to the present invention.
Figure 1E:
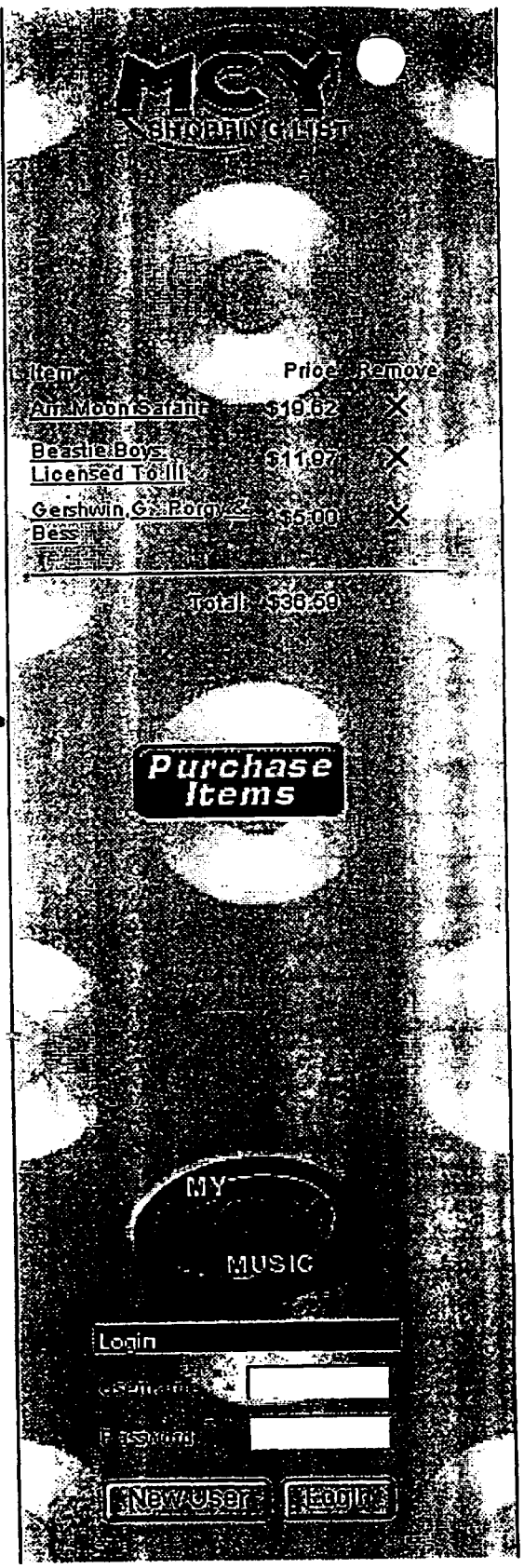
FIG. 1E illustrates in detail the shopping basket containing the desired items.

FIG. 1D is a block diagram of the network-based music distribution system according to the present invention. An on-line customer, such as the PC user 18 described above, logs onto a vendor's web site 20 via the Internet. The vendor's web site 20 is representatively shown in the figure as MCY MediaCity™. It is understood, of course, that the web site as shown in FIG. 1D is supported by a server having specific software and hardware configurations, such as Sun Microsystems mid-range computer with Windows operating system for executing applications programs written in Java, HTML or other programming language.

On the web site, the on-line customer may pre-listen to the desired music prior to the purchase. Following the pre-listen operation, the on-line customer may place an order for an immediate digital delivery of the selected music, book, etc., if available in digital format. Alternatively, she can order the selected information, such as text, moving or still images, graphics, etc., to be downloaded to her computer. Yet another option is to mail order CDs, video cassettes or disks, books, etc., for delivery to the designated place, such as home, place of work, friend's home. Still another option for the on-line consumer is to mail order a personally compiled CD containing selections from various artists, as specifically prepared by the web site vendor. Of course, those and additional buying options are presented to the on-line consumer via the graphical user interface (GUI) on the web site.

Continuing further with the description of FIG. 1D, regardless of the type of order or type of media selected by the on-line consumer, the desired items are placed in the shopping basket 22, as illustrated in detail in FIG. 1E. The on-line consumer may delete the items from the shopping basket or pre-listen to the tracks prior to the final purchase. After the list in the shopping basket 22 is finalized, the on-line consumer is requested to pay for the purchase. A charge may be made directly to the on-line consumer's credit card 24, or the payment may be tendered in other ways as customary in the trade. After confirming the receipt of payment, the product is delivered to the consumer. The delivery 26 is carried out by downloading the purchased digital music or text/graphics of the purchased information. Such operation requires the system's digital delivery software module to access a database for storing digital music, text, graphics, images, etc., requesting a copy of the purchased items, copying the purchased items from the database and transferring the copies of the purchased items to the consumer via the communications link established with the consumer's PC over the Internet.

If the purchased items are to be delivered by mail, then the system's mail delivery software module accesses a database for storing track/album titles available in CD format or titles of books, disks or other products available in the appropriate tangible medium. The titles of the purchased items are retrieved and transferred to a terminal controlled by a live operator. The operator may then contact a record/book warehouse, book/video shop for hard to find and special order items, or other contractual arrangements for outsourcing the order as customary in the industry. The operator subsequently supplies the customer's name and shipping address for fulfillment of the order, whereby the purchased items are shipped directly to the customer under the web site vendor's name.

Figure 2A:
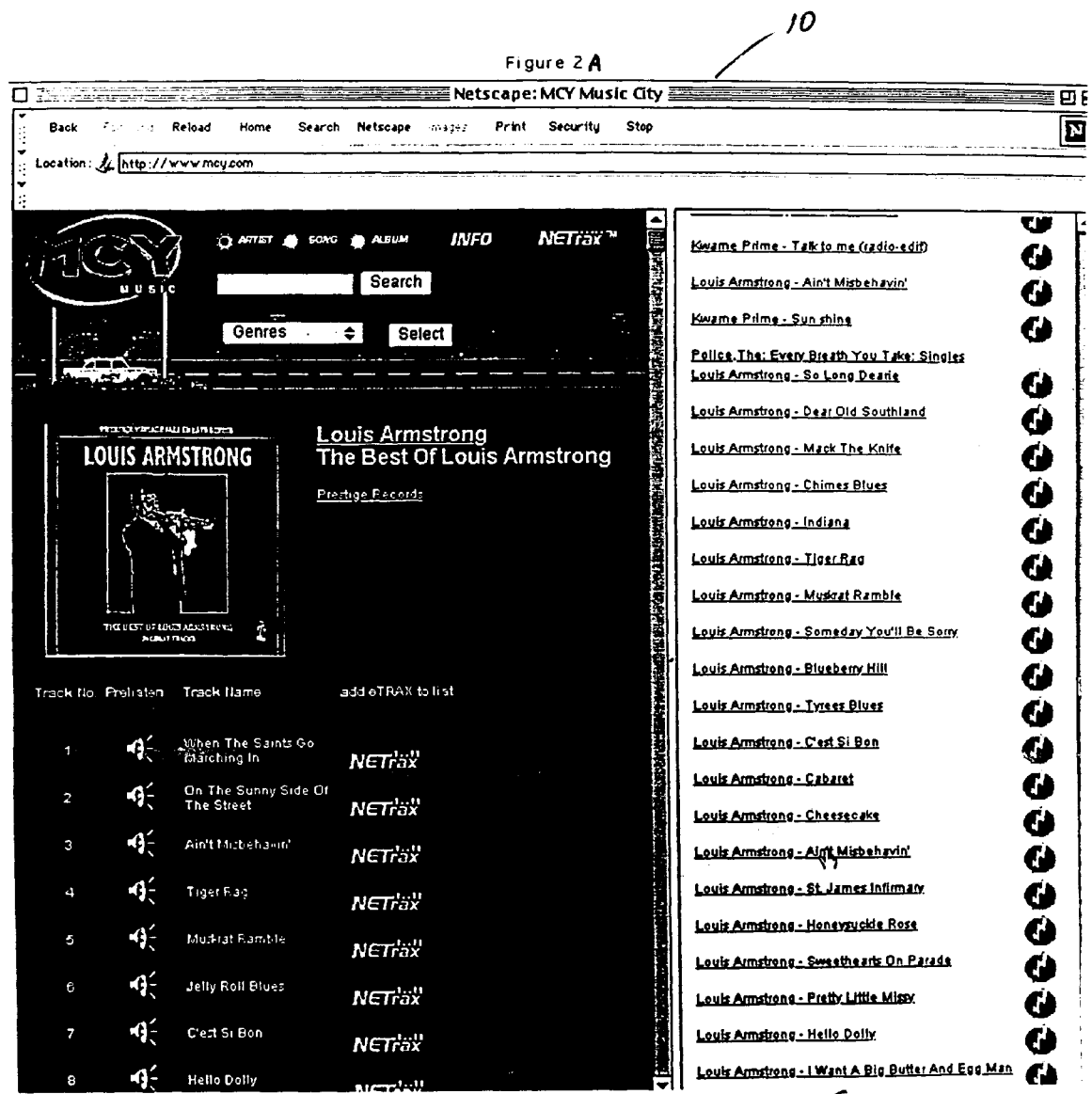
FIG. 2A shows an illustration of the monitor screen displaying another feature of the network-based system according to the present invention.

FIG. 2A shows an illustration of the monitor screen 10 displaying another feature of the network-based system according to the present invention. The right portion of the screen lists tracks and/or albums previously purchased by the PC user. In particular, after authorizing the PC user's login as described above, the system's "history" software module accesses the database for storing record information for all previous sales activity. Those records pertaining to the PC user's purchases are selected by the module and transferred to the display software module for displaying on the screen. The records reflecting previous purchases are listed under the "Past Orders" sub-heading, as shown in detail in FIG. 2B.

The shopping history subsystem allows every customer who has ever previously shopped on the web site to access a list of all products that the consumer has purchased in the past. The access to the past purchases is provided after typing in a username and password. After entering this information, the PC user finds all products previously purchased at the lower portion of the shopping list. All items obtained at the web site are displayed, and a vertical scroll bar may be required if the list is long. By clicking on one of these items, the main frame of the web site displays the product purchased. The customer can then go back and pre-listen to the songs (NETrax), as well as download the NETrax songs that were previously purchased.

In another aspect of the present invention, the inventive network-based system allows authors, composers, publishers and all related artists of a music product (collectively referred to as rights-holders) to have 24-hour, 7-day a week access to the worldwide sales of their product. FIG. 3A shows an illustration of the monitor screen 10 displaying the user interface for accessing the information on royalties.

A rights-holder accesses a web page for entering the proper identification information. As shown in the figure, login name and password are required for gaining access to the sales information. After entering the identifier, including the login name or username and password, the rights-holder is presented with a complete list of time, date and product name, amount, pricing and sales of the product distributed through the web site vendor. For example, royalty collection societies get access 24 hours/day, 7 days/week to the digital distribution platform where they can access the digitally distributed NETrax sales and then can collect money from the relevant parties.

Figure 3B:
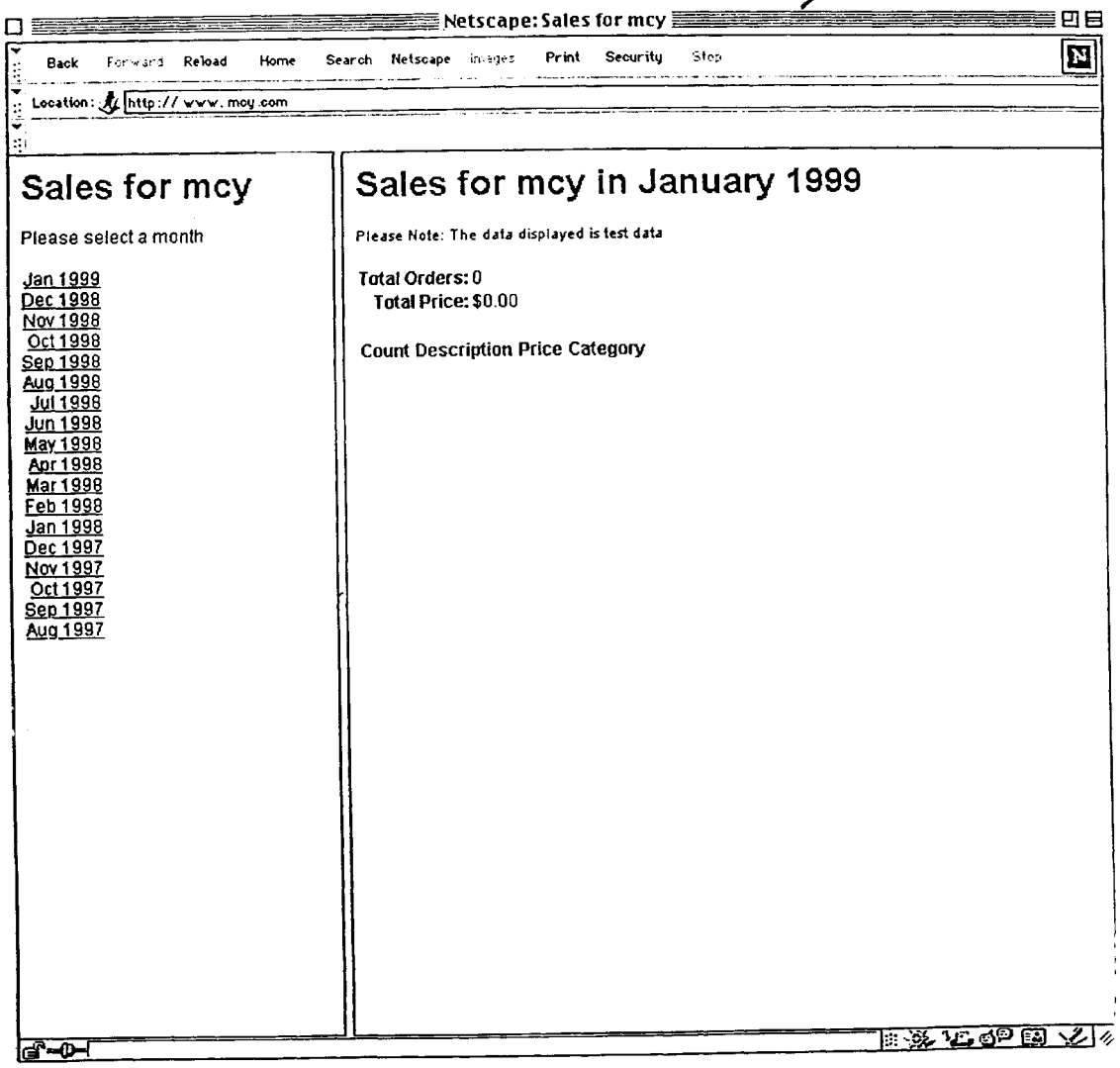
FIG. 3B shows royalty information maintained as a historical record (showing all the royalties earned to date) or as an incremental record (showing all the royalties currently outstanding)

The sales sub-system of the present invention maintains a record on a computer database (or the like) of all the purchases ever made by the user. Certain products and services will generate revenue for third party rights holders. For example, songwriters and royalty societies will obtain revenue based on the sales of records and songs. The sub-system permits the rights holders to access the web page of the computer system and determine what royalties they have generated. This royalty information can be maintained as a historical record (showing all the royalties earned to date) or as an incremental record (showing all the royalties currently outstanding), as illustrated in FIG. 3B.

The rights-holders for a particular song can access the web site and determine that a particular song was purchased, how many times the song was purchased, what the cost of the song was and what royalties are due to the rights holder. Of course, other information about the sale can be presented to the rights-holder, as desired by the designer of the particular system.

FIG. 3C is a block diagram of the sales sub-system for determining sales and royalties for the rights-holders in accordance with the present invention. After a customer 30 buys a track or album via the web site as described above, the sales information is stored to a database 32 at MCY Music web site. A rights-holder may access the stored information via the Internet to check for royalties due.

After the login, the rights-holder may decide, for example, to check the sales for a particular album for the last 6 months. The sales tracking module accesses the sales information stored to the database after each customer's purchase transaction and then selects only the sales information pertaining to the desired album for the last 6 months. The selected information is then transferred to the display module for display.

In one aspect of the present invention, the rights-holder is restricted to the sales information stored in the database based on her connection to the commercial product. For example, composers, authors and publishers may be allowed to view one type of sales information, while performers, such as singers, musicians, etc., can view another types of sales information. In addition, the system can calculate the dollar amount to be collected by the requesting rights-holder if a predetermined percentage from the sales is supplied by the rights-holder. For example, if a performer collects 5% from the sale of her album, then the system can calculate the total dollar amount owed to the performer during a specified period of time in accordance with the specified royalty rate.

As described above, once the PC user purchases a song or album in digital format, she can download the purchased music to her PC many times. In case her PC is damaged, the customer retains the right to the unlimited access after the purchase in case various eventualities occur, for example a crash of the hard drive or some other damage to the PC. In accordance with another aspect of the present invention, however, this unlimited access to the web site vendor's database does not allow the PC user to take advantage of this feature of the present invention for illegal purposes. For example, it appears as if the PC user may purchase a song, download it to her hard drive and then transfer the downloaded music to a portable storage medium or to another PC user via the Internet for playback.

To prevent the playback of the digital music that is illegally transferred from the purchaser, each song, album, or other property in digital format is assigned an identifier or key. This customer key is created for each user/customer corresponding to the username/password pair. Prior to the first download (namely, the first time that the customer desires to purchase a song through download), she logs in by entering username and password as described above. When the login is confirmed, the customer is supplied a key, which may be encrypted or unencrypted, over a secure network. The customer is not aware of this transfer from the server, and the actual key is never in the clear, never displayed to the customer.

The received key is then appended with additional data. This additional data uniquely identifies the customer's PC. For example, some information from the customer's hard drive or other computer hardware/software component may be added to the key. Alternatively, some other component information, either as a prefix or suffix, may be combined with the received key. As a result, the new key uniquely identifies the customer and the customer's hardware. This key is then stored to the customer hard drive.

Prior to downloading a song, a key for the requesting customer is inserted into a header of the song. After the download, the key embedded in the header is used for comparing with the key on the customer's hard drive. Only if the two pieces of information provide an exact match, the song will be played at the customer's computer. Thus, if the customer decides to transfer a downloaded song to her friend, the song will not be played at her friend's computer because the new computer will not contain data that will match the key embedded in the song header.

The file stored to the customer's hard drive may contain more than 1 key. For example, a key ring file may contain 3 keys, wherein each key is used by a different PC user.

Figures 4A, 4C:
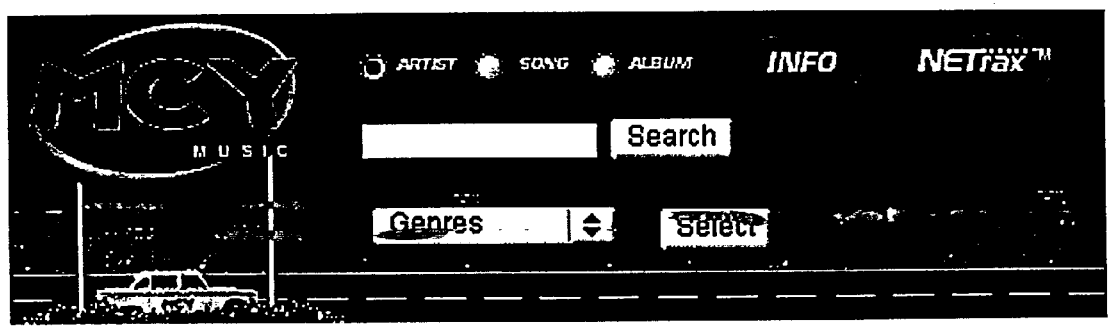
FIG. 4A shows the name of the encoding format for digital music in accordance with the present invention.
FIG. 4C shows a portion of the screen displaying the user interface for the web site for distributing digital or analog music according to the present invention.

FIG. 4A shows the name of the encoding format for digital music, whereby this format allows the header supplied to each digital file to contain the key for identifying the requester of information. Namely, as soon as the customer requests the NETrax song for downloading, the key corresponding to that customer is inserted into the header of the NETrax song for matching as described above.

Figure 4B:
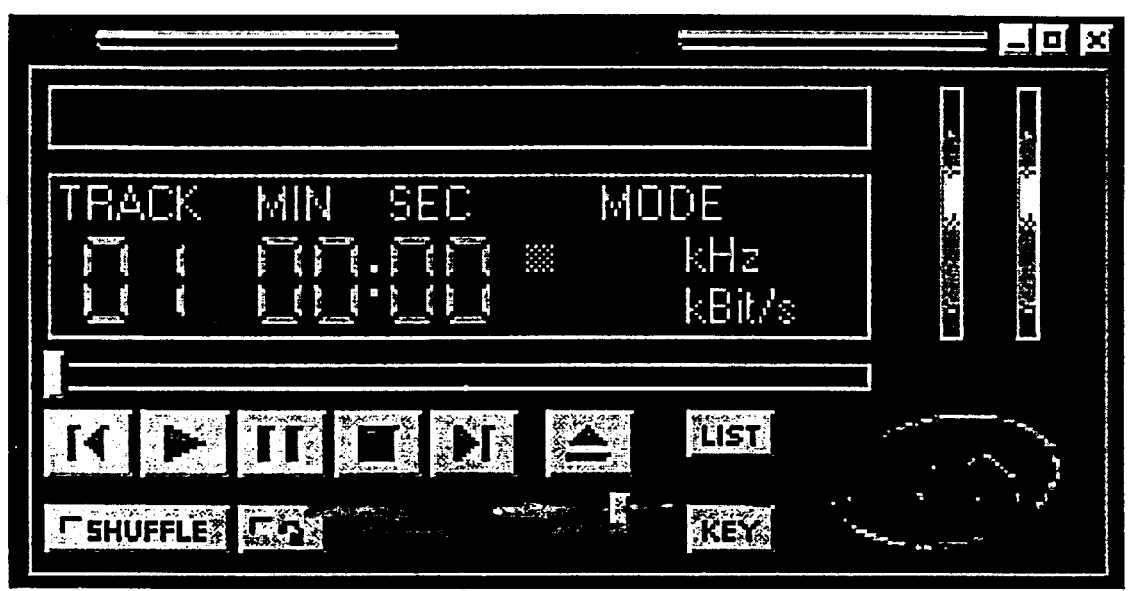
FIG. 4B shows a portion of the screen displaying a music player for listening to the downloaded music in the NETrax or MP3 format.

FIG. 4B shows a portion of the screen displaying a music player 40 for listening to the downloaded music in the NETrax or MP3 format. The player 40 has "software" buttons for controlling the music playback that is similar to the conventional controls on the player. The player may play songs encoded in other formats, such as MP3 for example.

Figure 4:
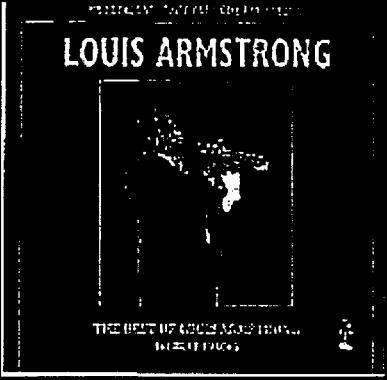
FIG. 4D shows a screen display whereby the search is performed by an album.
FIGS. 4E–4L show screen displays in response to the PC user search by different genres, such as electronica and dance, jazz, hip-hop, rap, R&B, country, rock and pop, world, children's and miscellaneous.
Figure 9E:
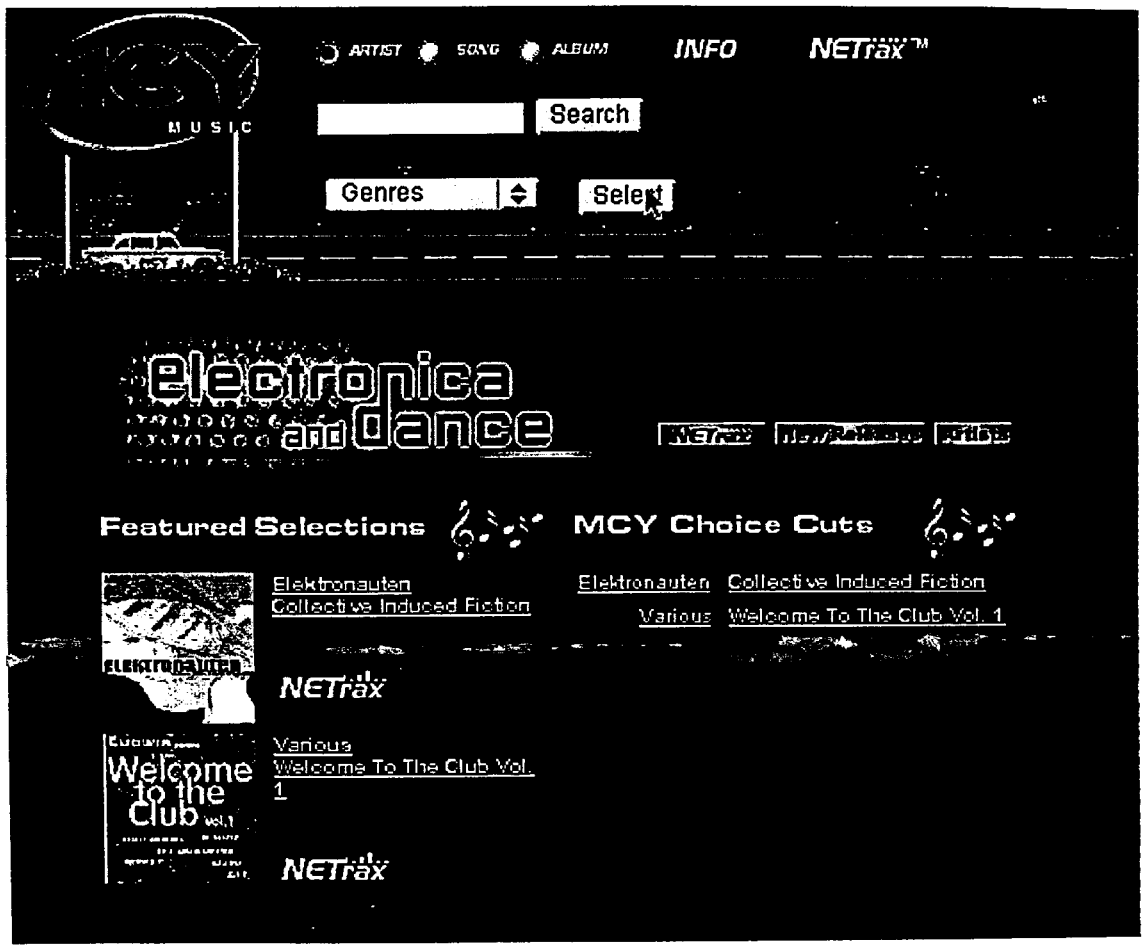
Figure 4F:
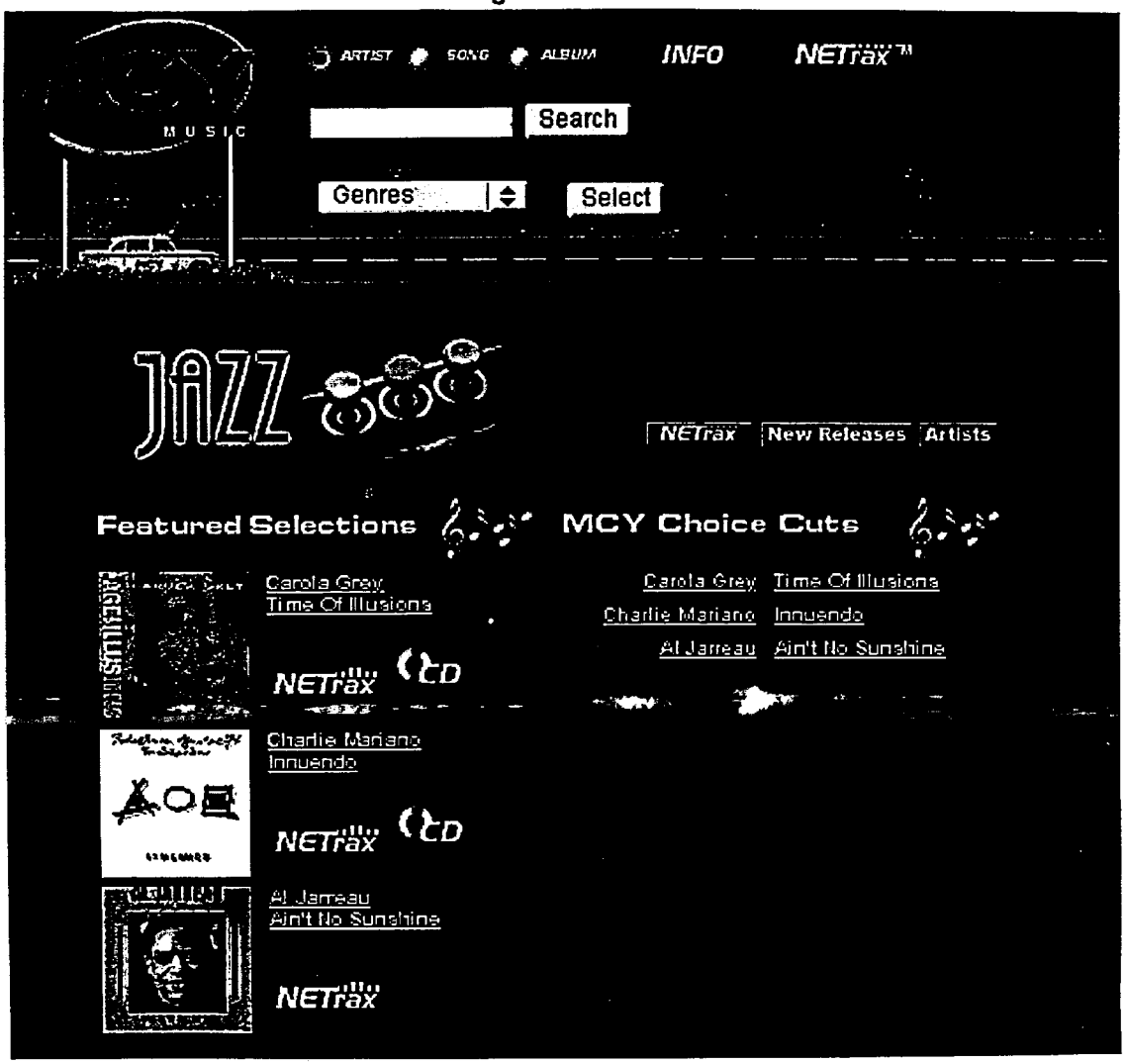
Figure 4G:
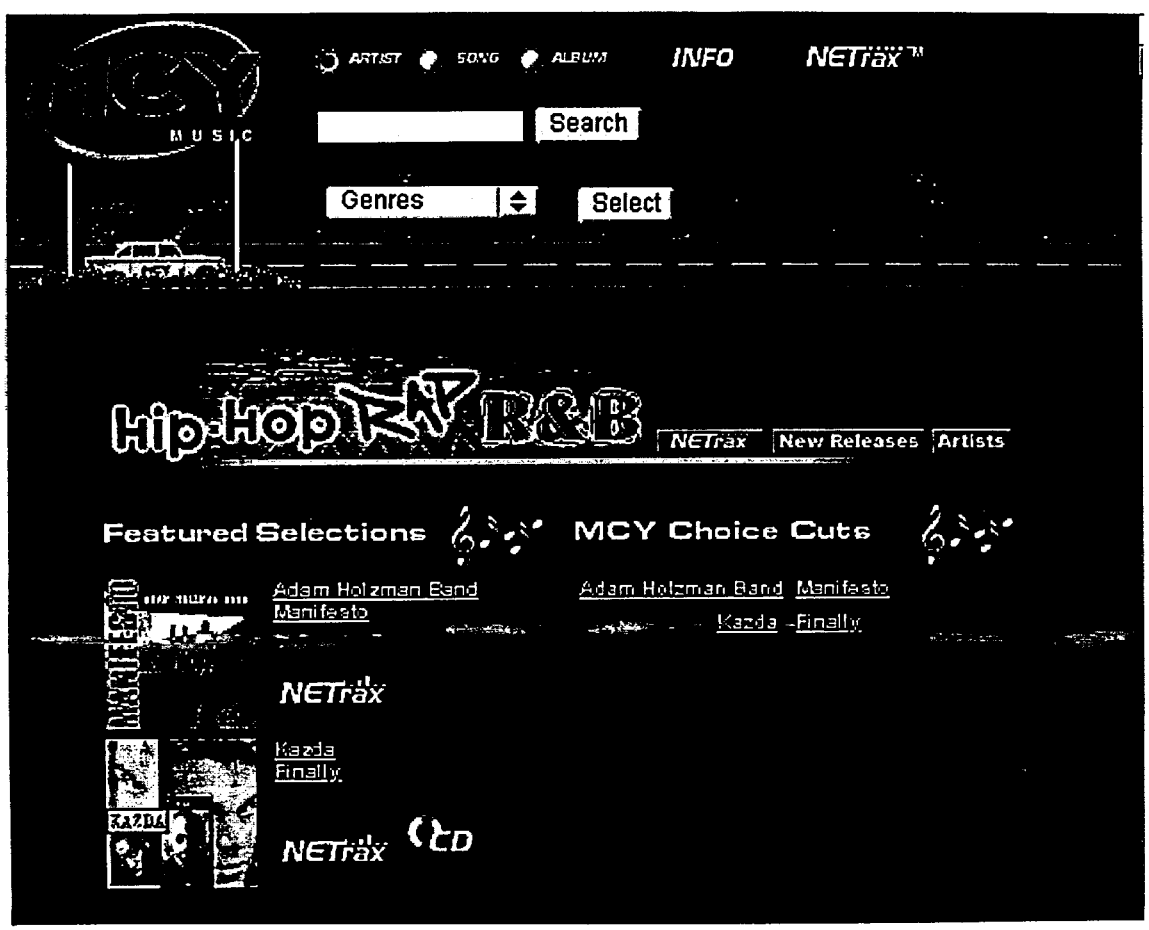
Figure 4H:
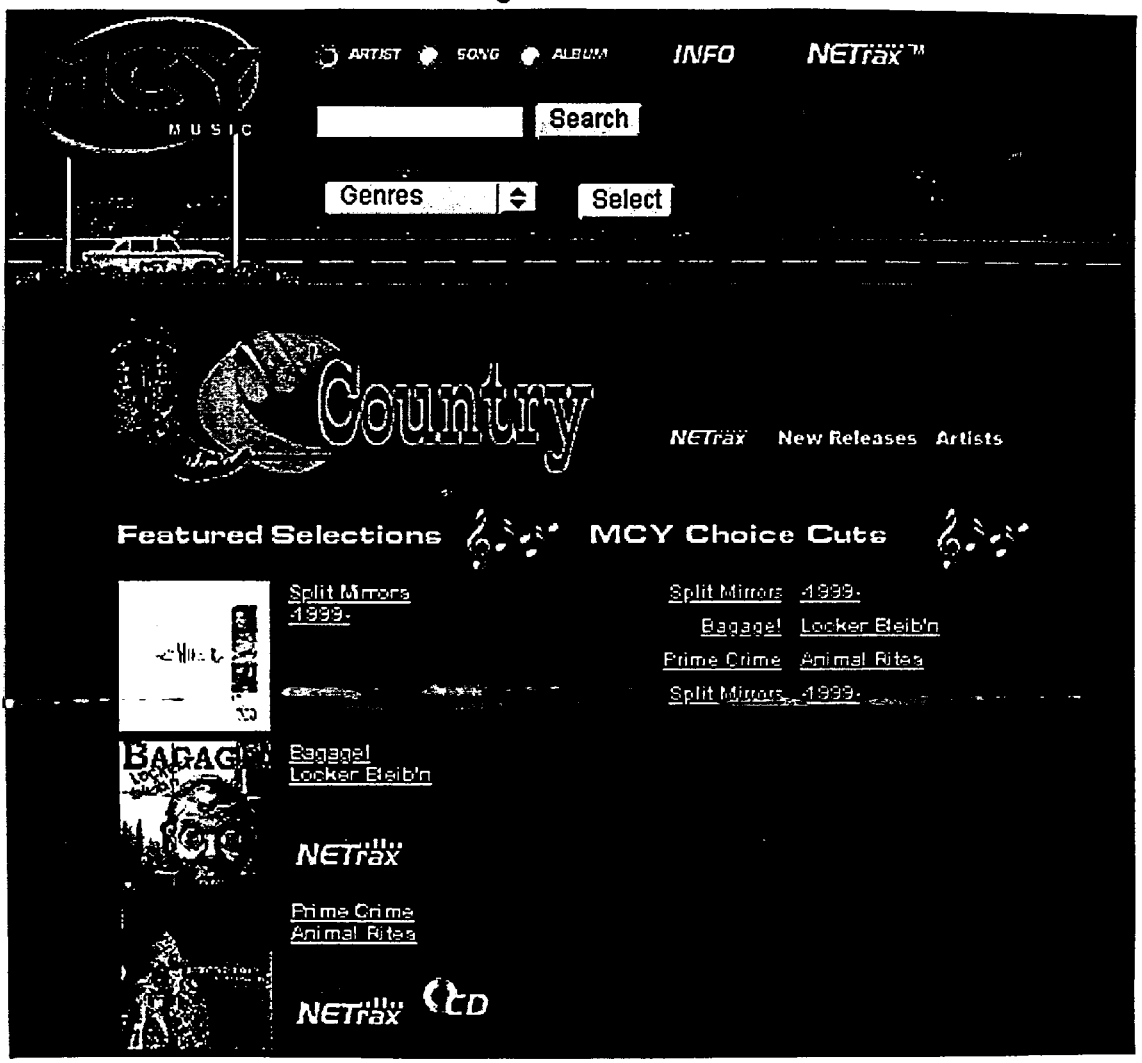
Figure 4I:
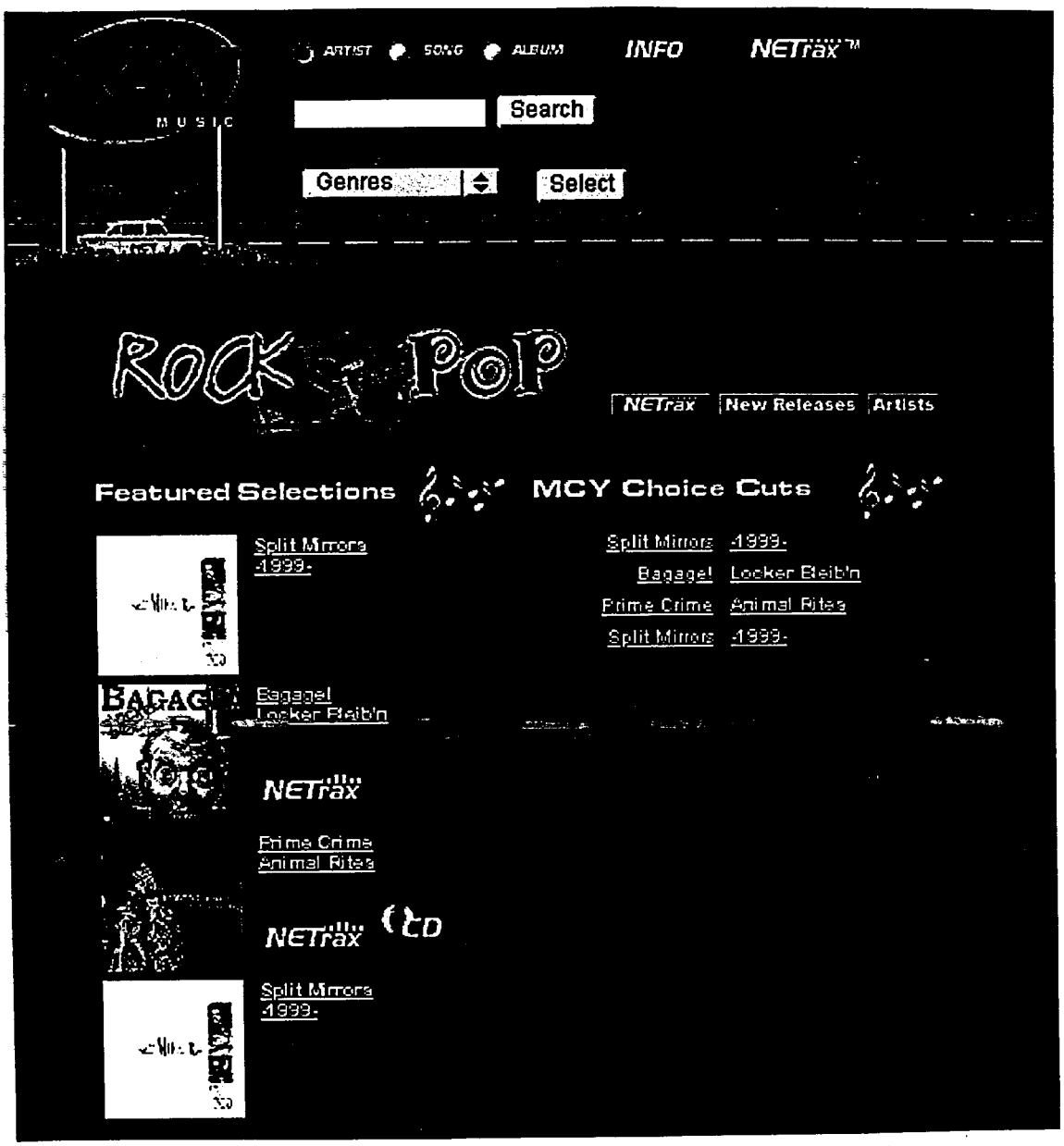
Figure 4J:
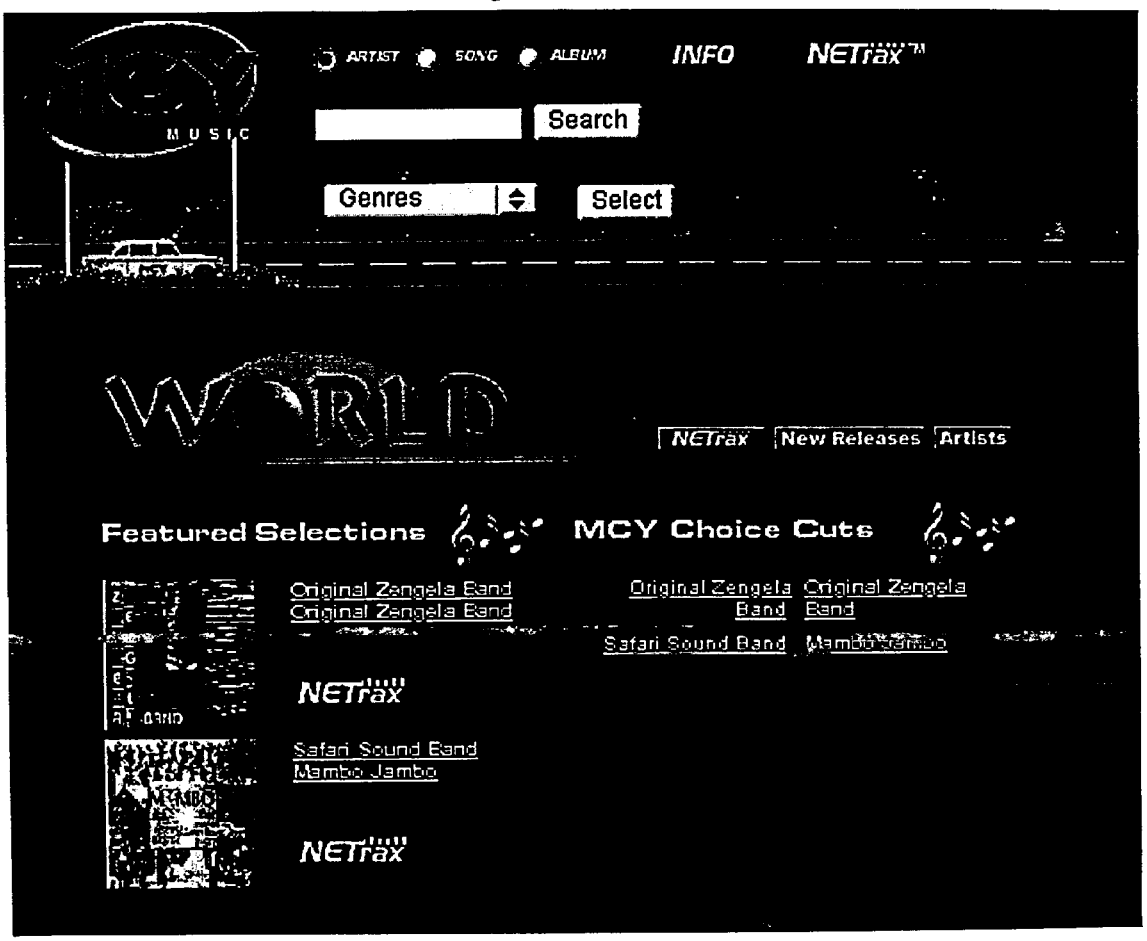
Figure 4K:
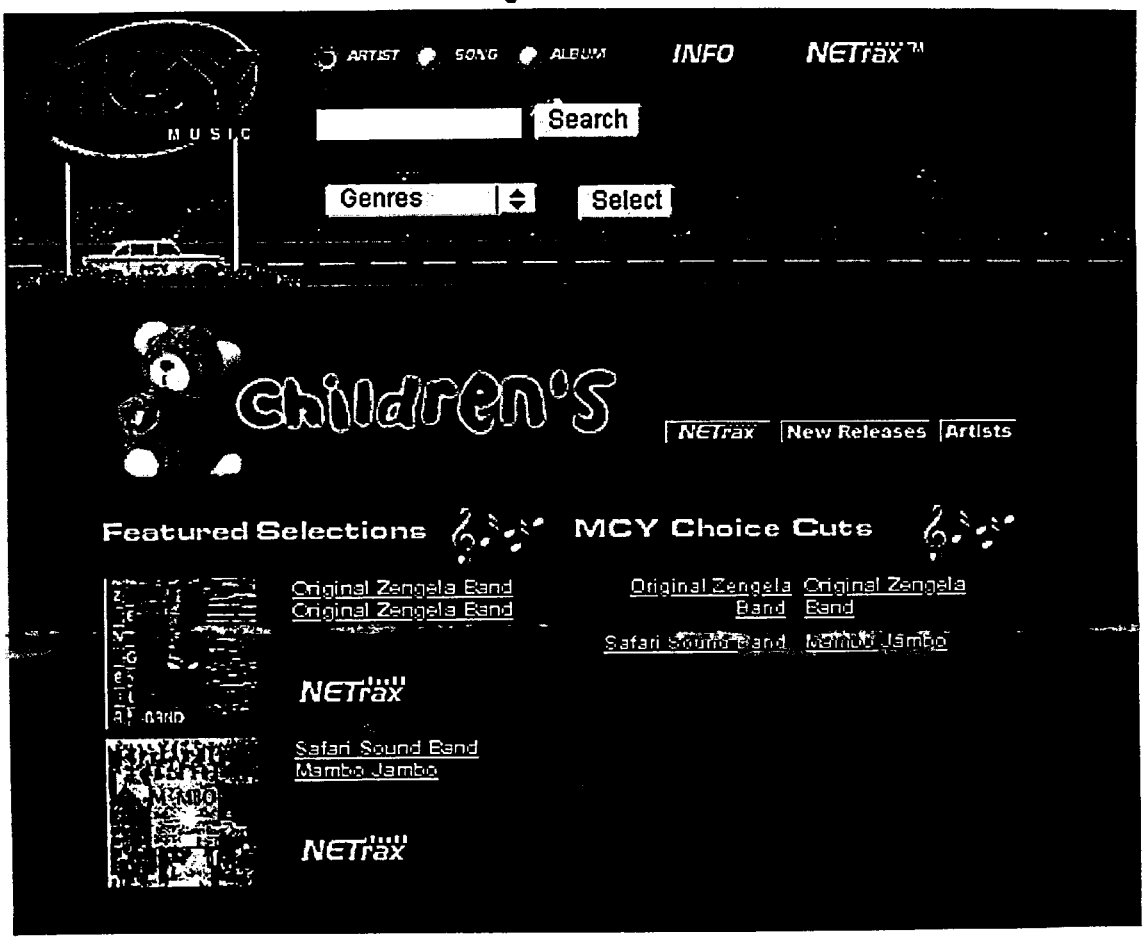
Figure 4L:
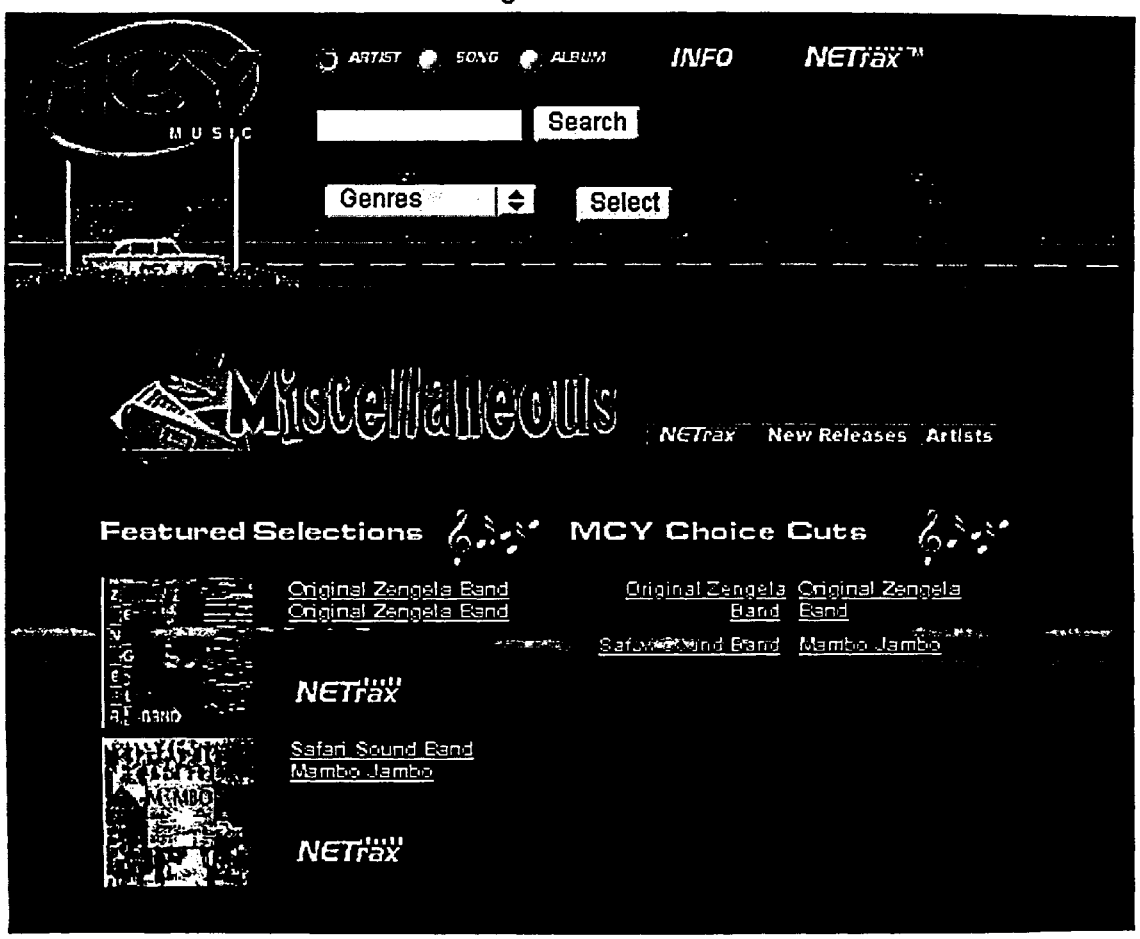

FIG. 4C shows a portion of the screen displaying the user interface for the web site for distributing digital or analog music as described above. Various search engines are available to the PC user to browse through the on-line selections and to purchase the desired music. FIG. 4D shows a screen display whereby the search is performed by an album. FIGS. 4E–4 show screen displays in response to the PC user search by different genres, such as electronica and dance, jazz, hip-hop, rap, R&B, country, rock and pop, world, children's and miscellaneous.

Figure 5:
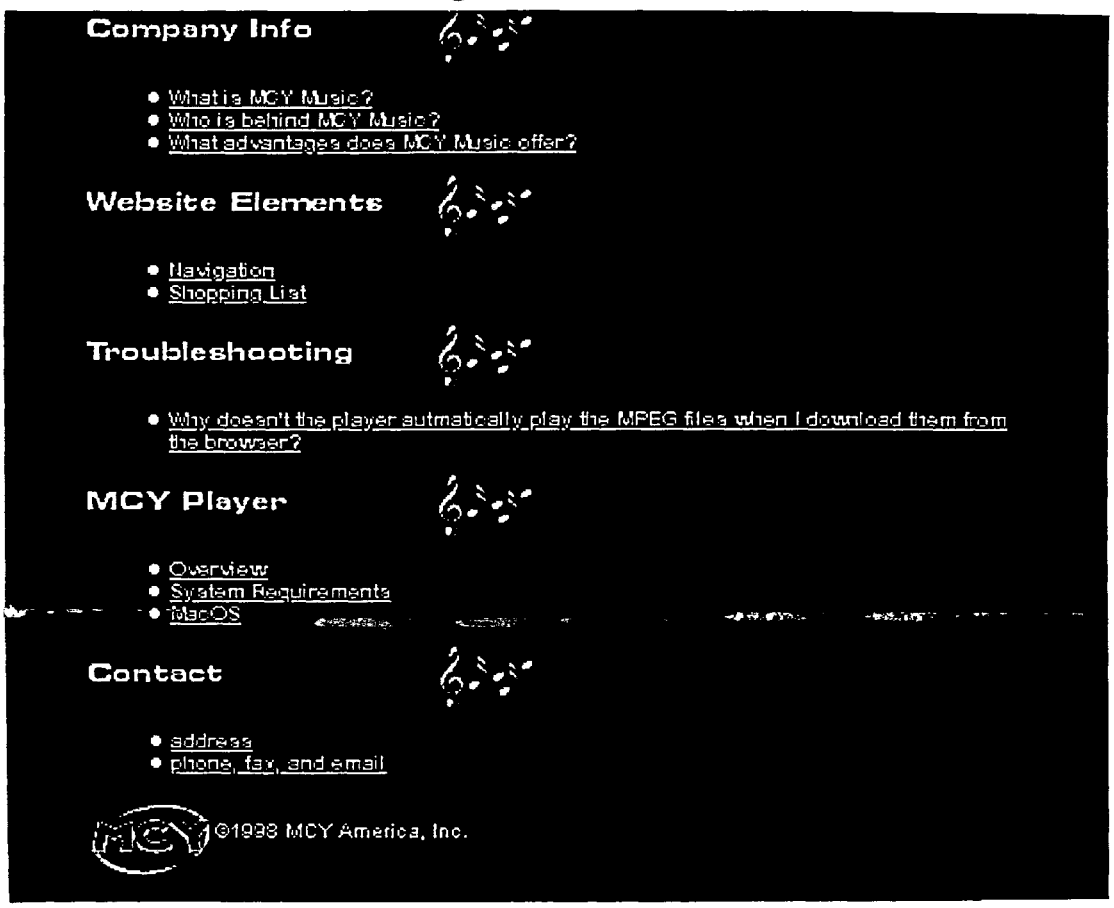
FIG. 5 shows a screen displaying a page for various other portions of the web site, whereby additional information may be obtained by clicking on the displayed heading or sub-heading.

FIG. 5 shows a screen displaying a page for various other portions of the web site, whereby additional information may be obtained by clicking on the displayed heading or sub-heading. A new web page will then be displayed for listing the requested information.

Figure 6:
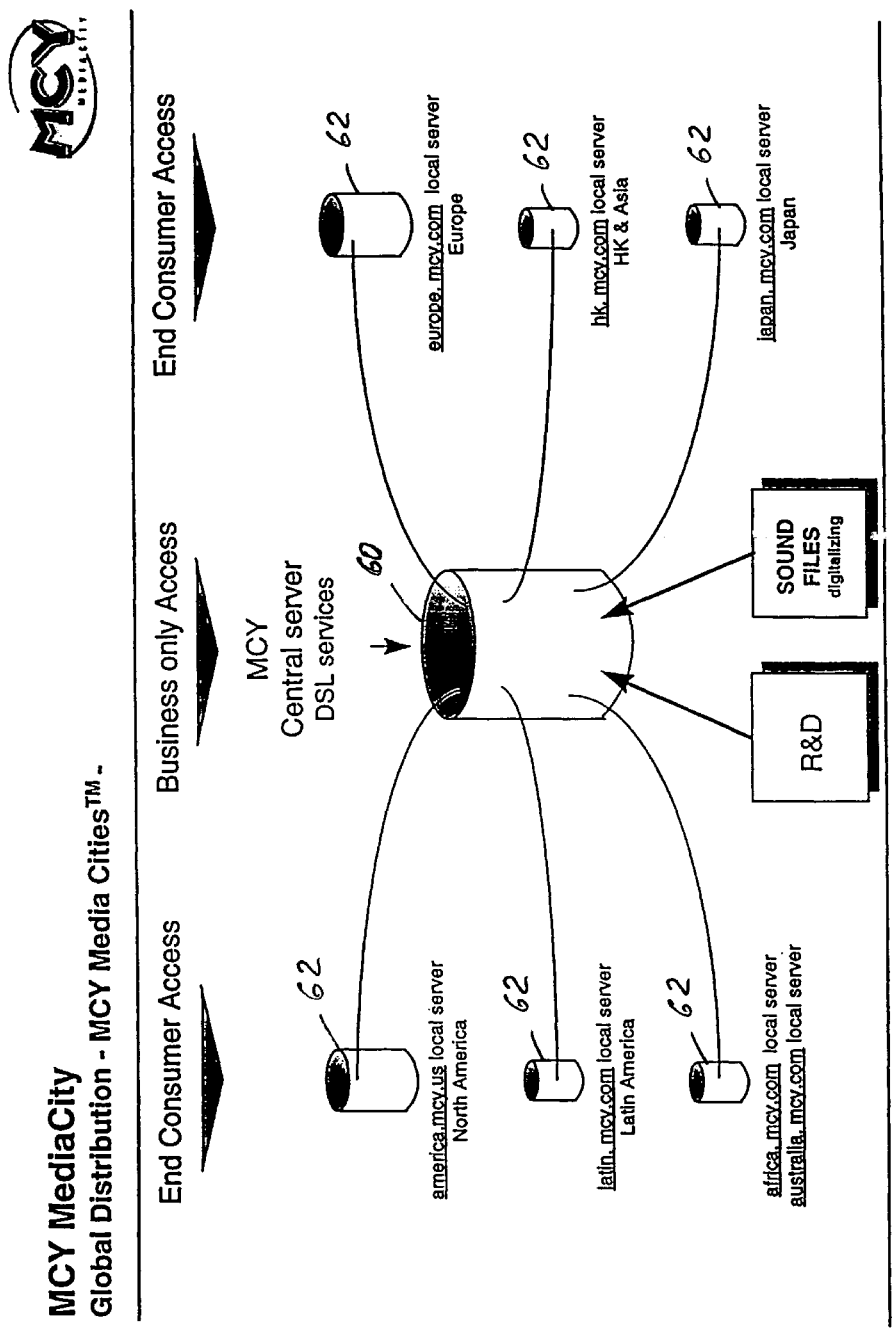
FIG. 6 shows a block diagram of the database structure in accordance with the present invention.

FIG. 6 shows a block diagram of the database structure in accordance with the present invention. A central server 60 is connected to a database which is a repository of sound files in digital format for downloading to the PC users. Another portion of the database contains user accounts, wherein each account holds user ID, password, key, and pointers to the purchased music in the database. Still another portion of the database contains a historical list of all items sold, either in digital format or CD. For each sold item, its title, price, artist name, etc., are maintained in the database, which is used for checking royalty information as described above.

FIG. 6 also shows regional servers 62 for accessing the central database. These local servers may contain information in their databases that is unique to a particular region of the world.

Figure 7:
FIG. 7 is a block diagram of various software and hardware units (sub-systems), as well as database components, comprising the overall system of the present invention.

FIG. 7 is a block diagram of various software and hardware units (sub-systems), as well as database components, comprising the overall system of the present invention. It is understood that although several databases are listed in FIG. 7 in the preferred embodiment, the repository of data and information may be implemented as a single database. Similarly, two or more separate software sub-systems illustrated in FIG. 7 may be combined into one sub-system performing those functions as the individual sub-systems.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A system for distributing products over the Internet, comprising:

means for displaying a login screen on a video monitor that allows a user to enter an unique identifier for accessing database information;

means for confirming the validity of the entered unique identifier; and means for displaying a shopping list that lists items for purchase as selected by said user, the listed items being in digital format suitable for downloading to a user's computer connected to the Internet and being in other media format suitable for shipping to said user.

2. The system according to claim 1, wherein the listed items are either compact disks containing music recorded thereon or digital music in an encoded format.

3. The system according to claim 2, wherein said means for displaying displays said shopping list on said video monitor as long as at least one item is contained in said shopping list.

4. The system according to claim 3, further comprising means for retrieving a portion of digital music from a database and means for playing the retrieved portion of digital music.

5. The system according to claim 4, further comprising means for maintaining a shopping history list for said user for display on said video monitor.

6. The system according to claim 5, wherein said user is permitted to download an unlimited number of times previously purchased items selected from said shopping history list.

7. The system according to claim 5, wherein said user is permitted to download a preselected number of times previously purchased items selected from said shopping history list.

8. The system according to claim 3, further comprising means for calculating royalties from the sale proceeds of digital music and compact disks and means for displaying the results of the calculation.

9. The system according to claim 8, wherein said royalties are calculated for a user-selectable predetermined period of time.

10. The system according to claim 1, wherein said means for displaying displays items available for purchase or browsing in a first portion of the display and displays said shopping list in a second portion of the display, said display consisting of said first and second portions.

11. The system according to claim 4, further comprising means for searching through said items available for purchase or browsing in said first portion of the display using a user selectable search criterion.

12. A method for distributing products over the Internet, comprising:

displaying a login screen on a video monitor that allows a user to enter an unique identifier for accessing database information;

confirming the validity of the entered unique identifier; and displaying a shopping list that lists items for purchase as selected by said user, the listed items being in digital format suitable for downloading to a user's computer connected to the Internet and being in other media format suitable for shipping to said user.

13. The method according to claim 12, wherein the listed items are either compact disks containing music recorded thereon or digital music in an encoded format.

14. The method according to claim 13, wherein said shopping list is displayed on said video monitor as long as at least one item is contained in said shopping list.

15. The method according to claim 14, further comprising retrieving a portion of digital music from a database and playing the retrieved portion of digital music.

16. The method according to claim 15, further comprising maintaining a shopping history list for said user for display on said video monitor.

17. The method according to claim 16, wherein said user is permitted to download an unlimited number of times previously purchased items selected from said shopping history list.

18. The method according to claim 14, further comprising calculating royalties from the sale proceeds of digital music and compact disks and displaying the results on said video monitor.

19. The method according to claim 18, wherein said royalties are calculated for a user-selectable predetermined period of time.

20. The method according to claim 12, wherein items available for purchase or browsing are displayed in a first portion of the display and said shopping list is displayed in a second portion of the display, said display consisting of said first and second portions.

21. The method according to claim 15, further comprising searching through said items available for purchase or browsing in said first portion of the display using a user selectable search criterion.

* * * * *